(No Model.)
A. STAMM.
APPARATUS FOR PREPARING OXYGENATED AIR.
No. 300,027. Patented June 10, 1884.
2 Sheets—Sheet 1.
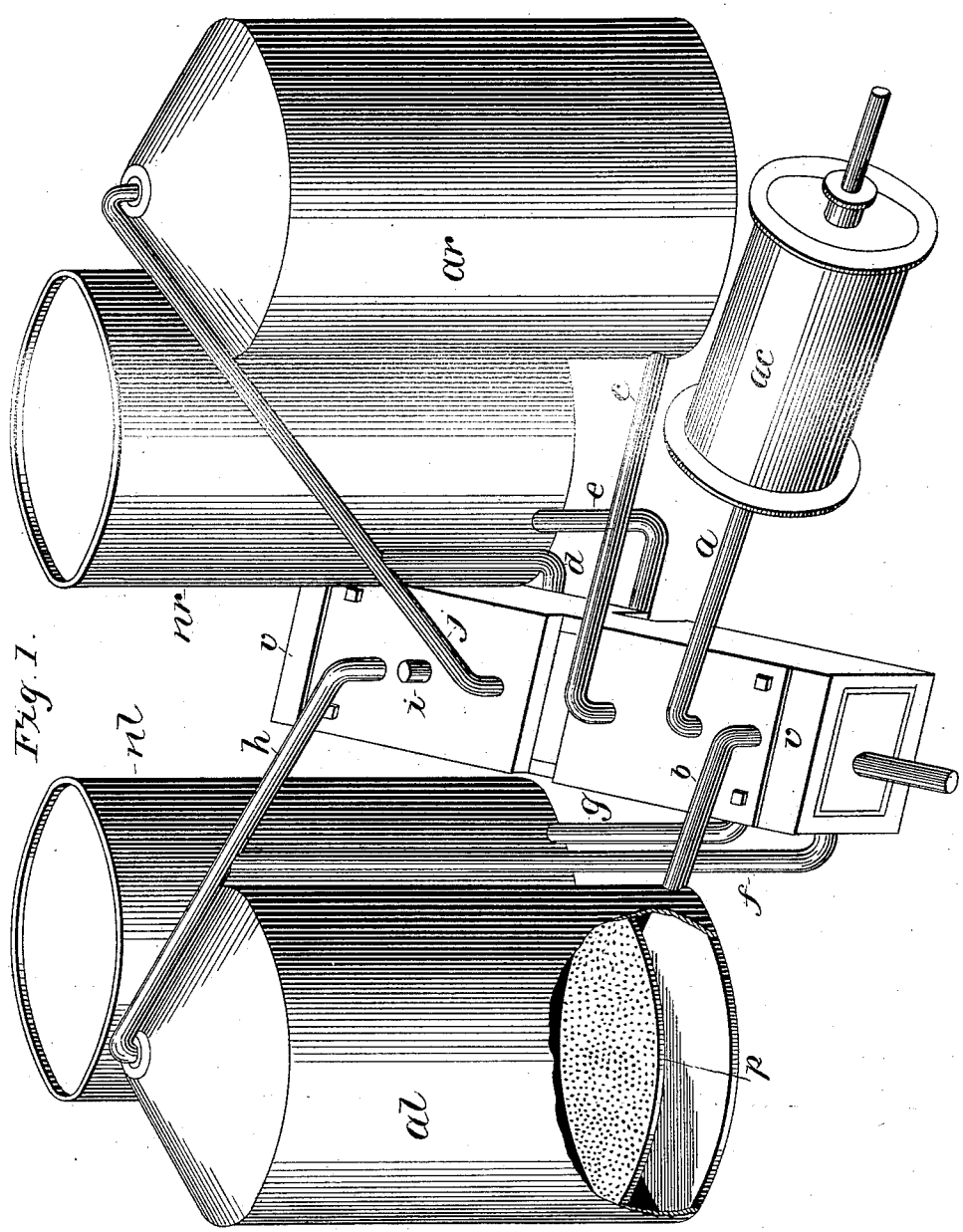

(No Model.) 2 Sheets—Sheet 2.
A. STAMM.
APPARATUS FOR PREPARING OXYGENATED AIR.
No. 300,027. Patented June 10, 1884.
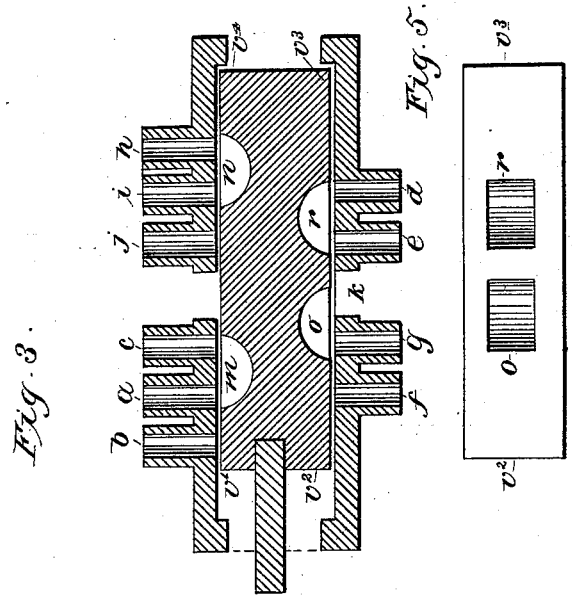
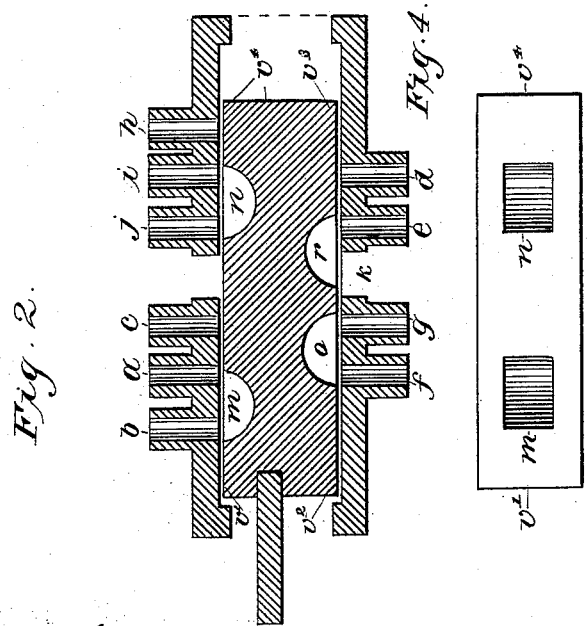
Witnesses
C. H. Murray
H. Woods
Inventor
Anton Stamm

UNITED STATES PATENT OFFICE.

ANTON STAMM, OF LEADVILLE, COLORADO.

APPARATUS FOR PREPARING OXYGENATED AIR.

SPECIFICATION forming part of Letters Patent No. 300,027, dated June 10, 1884.

Application filed April 18, 1883. (No model.)

*To all whom it may concern:*

Be it known that I, ANTON STAMM, a citizen of the United States, residing at Leadville, in the county of Lake and State of Colorado, have invented an Improved Apparatus for Preparing Oxygenated Air; and I do hereby declare that the following is a full and correct description of the same.

Heretofore no apparatus has been known by which air richer in oxygen than the atmospheric air can be obtained by a perfectly automatic process of working through the medium of absorbing-liquids. In J. T. A. Mallet's apparatus, (see British Patent No. 2,137 of July 15, 1869,) which has some features similar to mine, a hand-lever and bell-crank are used for alternately opening and closing the exit-pipes for the nitrogenated and oxygenated portions of air, and the air-compressor has to be stopped every time when the oxygenated air is being liberated from the absorbing-liquids. His apparatus is therefore not automatic in its working, nor does it furnish a continuous stream of oxygenated air.

The object of my invention is to devise an apparatus by means of which, with the aid of absorbing-liquids, an air-mixture containing proportionately more oxygen than atmospheric air can be prepared by a perfectly automatic process, and the said air-mixture can be obtained in a continuous stream on a large as well as on a small scale.

The apparatus is shown in the accompanying drawings, in which Figure 1 gives the general arrangement of the different parts belonging to it. Figs. 2 and 3 show longitudinal sections of the valves in their two principal positions of rest; and Figs. 4 and 5 give plan views of the top and bottom faces of the valves proper.

In Fig. 1, $ac$ represents an air-compressor. It may be of any suitable construction. The pipe $a$ connects it with the valve $v'$.

$al$ and $ar$ are two strong air-tight tanks filled with such liquids which absorb oxygen more readily and in proportionately larger quantities than nitrogen when brought in contact with them. As absorbing-liquids, I generally prefer water with a small addition of glycerine or oil to form a thin layer on top of the water. For brevity's sake, I call the tanks containing these liquids simply "water-tanks."

$nl$ and $nr$ are two other closed tanks, equally strong and air-tight as the water-tanks. They serve for holding that portion of the introduced air which is not absorbed by the liquids in the water-tanks. This portion consisting mostly of nitrogen, I shall call these two tanks "nitrogen-tanks." The water-tanks $al$ and $ar$ have each a horizontal diaphragm, $p$, perforated with many fine holes. They may have two or more such diaphragms to insure a fine subdivision of the introduced air and a correspondingly perfect absorption. The bottom parts of the water-tanks are connected with the valve $v'$ through the pipes $b$ and $c$, and their top parts are connected with the valve $v^4$ by the pipes $j$ and $h$ and with the valve $v^2$ by the pipes $d$ and $f$. The nitrogen-tanks $nl$ and $nr$ communicate with the valves $v^2$ and $v^3$ by means of the pipes $g$ and $e$, and through these pipes and valves, in connection with the the pipes $f$ and $d$, they communicate with the water-tanks $al$ and $ar$. The four valves $v'$ $v^2$ $v^3$ $v^4$ are shown as having a square shape with flat surfaces, because in this shape I can illustrate their working best. In practice they may have various other shapes, and may be combined among themselves in various other ways. These valves may be similar to the slide-valves of steam-engines, or similar to piston-valves, or they may be made on the principle of rotary valves, &c. In large apparatus they are best separate, each valve being in a chest by itself and supplied with its own valve-rods. In smaller apparatus the valves may be so combined as to form only one machine, as in Figs. 2 and 3; or, yet, two or three of the valves may be combined in various ways, so as to form compound valves, and be inclosed in two or three valve-chests, the valves being, in the latter case, moved forward and backward by two or three different valve-rods; but the valves must in all cases be so arranged and connected with one another, by means of valve-rods or otherwise, that they always move simultaneously in the same direction and always rest simultaneously for the same length of time, so that when one valve is in the forward position all four are in the same position, and when one is in the backward position, all of them are in that position. These four valves are moved forward and backward after certain intervals of rest by a suitable mechanical device worked by the engine in an automatic manner. (This mechanical moving device forms no part of the present specification.) The lengths of the intervals of rest between the two opposite motions of the valves I shall call "minutes," no matter whether their actual duration for any given apparatus be longer or shorter than sixty seconds of time.

The mode of operating my apparatus is as follows: The air-compressor $ac$ is worked continuously by any suitable motive power. The compressed air passes through the pipe $a$ to the valve $v'$. In the forward position, Fig. 2, of the valve, its port $m$ establishes communication between the pipes $a$ and $b$. The pipe $b$ therefore conveys the compressed air into the lower part of the water-tank $al$ during the first minute. At the expiration of the first minute the valve $v'$ is moved backward into its second position, as shown in Fig. 3. In this position the valve closes the pipe $b$ and opens communication between the pipes $a$ and $c$. The compressed air passes, therefore, by the pipe $c$ into the lower part of the tank $ar$ during the second minute. In this manner the two water-tanks $al$ and $ar$ are filled with compressed air during alternate minutes. The air, being driven into the tank $al$ below the perforated diaphragm $p$, passes upward through the fine perforations, enters the water from below in numerous fine streams, and passes upward through it in a state of fine subdivision. During this upward passage a certain portion of the air is dissolved and absorbed by the water. The portion of air so absorbed is in direct proportion to the pressure prevailing in the water-tank at the end of the first minute. That part of the introduced air which is not absorbed and retained by the water rises at once to the top of the tank $al$, and is thence conveyed by the pipe $f$ to the valve $v^2$, where it passes through the port $o$, Fig. 2, into the pipe $g$. The latter conveys it to the nitrogen-tank $nl$. The air driven into the water-tank $ar$ during the second minute enters the water also from below, and passes through it in an upward direction in many fine streams. It is likewise in part absorbed by the water and in part rejected by it. The pipe $d$ conveys this rejected portion, consisting mostly of nitrogen, from the top of the tank $ar$ to the port $r$ in valve $v^3$, whence it is conducted by the pipe $e$ into the second nitrogen-tank $nr$, where it remains until the valves are shifted again. Thus when, during the first minute, the water-tank $al$ is being filled with compressed atmospheric air the nitrogen-tank $nl$, which communicates with the tank $al$, is being filled with the nitrogenated air not absorbed by the water in $al$, and when, during the second minute, the water-tank $ar$ is being filled with fresh air from the compressor, the nitrogen-tank $nr$ is being filled with the nitrogenated air rejected by the water in the tank $ar$. During the second minute the valves are in the backward position, Fig. 3. The pipe $h$ is open at its valve end, and the pipe $f$ is closed by the valve $v^2$. The communication between the water-tank $al$ and the nitrogen-tank $nl$ is therefore closed, and the nitrogenated air contained in $nl$ is separated from the contents of the water-tank $al$. Then the absorbed air liberates itself from the liquids in $al$ and passes by the pipe $h$, through the port $n$, into the pipe $i$, and through the latter into a holder, or to the place where it is to be used. After the second minute all the valves are moved forward again into the position shown in Fig. 2. In this position the pipe $j$ is open at its valve-terminus, while the pipe $d$ is closed by the valve $v^3$. The absorbed air in the water-tank $ar$ is therefore separated from the nitrogenated air contained in the tank $nr$, and passes from the top of the water-tank $ar$, through the pipe $j$, port $n$, and the pipe $i$, into the holder, if there is any, or to the place where the oxygenated air is to be used. Thus the oxygenated air is furnished without interruption, the two tanks containing the absorbing-liquids supplying it every alternate minute in regular succession. During the second minute the pipe $g$ conveys the nitrogenated air from the tank $nl$, (where it has accumulated during the first minute,) through the port $o$, Fig. 3, and the exit-opening $k$ into the atmosphere. During the third minute the valves are in the forward position, Fig. 2. Then the pipe $e$, coming from the nitrogen-tank $nr$, is open at its valve end, and the nitrogenated air contained in the said tank escapes through the pipe $e$, port $r$, and the exit-opening $k$ into the atmosphere. Thus the tank $nl$ exhausts its contents of nitrogenated air during the same alternate minutes, when the oxygenated air is allowed to liberate itself from the absorbing-liquids in the water-tank $al$, with which it communicates during the filling operation, and the tank $nr$ exhausts its contents of nitrogenated air every time when the oxygenated air is liberated from the liquids in the water-tank $ar$, which occurs during those alternate minutes when the tanks $al$ and $nl$ are being filled with fresh atmospheric and nitrogenated air, respectively.

The foregoing description shows that my apparatus furnishes a continuous stream of oxygenated air as long as the air-compressor continues to drive atmospheric air alternately into the two water-tanks $al$ and $ar$, and the four valves $v'$, $v^2$, $v^3$, and $v^4$ are moved forward and backward after regular intervals (minutes) of rest. If it is desired to obtain an air-mixture in which the oxygen is still more concentrated than the first treatment yields it, then we put the pipe $i$, through which the oxygenated air issues from the first apparatus, into communication with a second similar but much smaller apparatus in place of the pipe $a$, and pass the oxygenated air through the absorbing-liquids of the second apparatus in the same manner as we have passed the atmospheric air through the liquids in the first treatment. This second treatment eliminates another portion of the nitrogen, and furnishes a gas-mixture that contains a much larger percentage of oxygen than the first treatment is capable of yielding. A third and fourth treatment concentrate the oxygen still more; but the quantity of the resulting oxygenated air is diminished by every subsequent treatment.

What I claim as my invention, and desire to secure by Letters Patent, is—

1. In an apparatus for preparing oxygenated air, the combination, with an air-compressor, of two strong closed tanks, (called "water-tanks,") which are filled with such liquids that absorb oxygen in comparatively larger proportion than nitrogen, preferably with water having a layer of oil or glycerine on top, the two tanks having each one or more horizontal perforated diaphragms, $p$, and being connected with the valve $v'$—one by the pipe $b$ and the other by the pipe $c$—all substantially as described, and for the purpose specified.

2. In an apparatus for preparing oxygenated air, the combination, with an air-compressor and two air-tight water-tanks, of two strong hermetically-closed air-tanks (called "nitrogen-tanks") for the temporary storing of the nitrogenated air, these two air-tanks being so connected with the water-tanks through the pipes $g$ and $f$ and $e$ and $d$ and by the valves $v^2$ and $v^3$ that while the first water-tank, $al$, is being filled with compressed atmospheric air the nitrogenated air can pass out at the top of the said water-tank into the first nitrogen-tank, $nl$, and while the second water-tank, $ar$, is being filled with compressed air the non-absorbed (nitrogenated) portion of air can escape by the top of this second water-tank into the second nitrogen-tank, $nr$, all substantially as described, and for the purpose specified.

3. In an apparatus for preparing oxygenated air, the combination, with an air-compressor, two water-tanks, and two nitrogen-tanks, of four valves, which may be of various shapes—such as slide-valves, piston-valves, rotary valves, &c.—and which may be either separate, so that each valve is in a chest by itself, or may be combined into one, two, or three compound valves having one, two, or three valve-chests and valve-rods, but which must be so constructed and connected that their movements are always simultaneous, and that in one of their principal positions of rest—as, for example, in their forward position—the communication is open between the pipes $a$ and $b$ through the port $m$ or some other equivalent means, between the pipes $f$ and $g$ through the port $o$, between the pipes $j$ and $i$ through the port $n$, and between the pipe $e$ and the exit-opening $k$ through the port $r$, while at the same time the valve ends of the pipes $c$, $d$, and $h$ are closed by the valves $v'$, $v^3$, and $v^4$, and the communication between the pipe $g$ and the exit-opening $k$ is closed by the valve $v^2$, and that when the valves are in their other backward position the communication is open between the pipes $a$ and $c$ through the port $m$ or its equivalent, between the pipes $d$ and $e$ through the port $r$, between the pipes $h$ and $i$ through the port $n$, and between the pipe $g$ and the exit-opening $k$ through the port $o$, while at the same time the valve ends of the pipes $b$, $f$, and $j$ are closed by the valves $v'$, $v^2$, and $v^4$, and the communication between the pipe $e$ and the exit-opening $k$ is closed by the valve $v^3$, all substantially as described, and for the purpose specified.

4. In an apparatus for preparing oxygenated air, the combination, with the air-compressor, two water-tanks, two nitrogen-tanks, and four valves, of the pipe $a$, connecting the air-compressor with the valve $v'$, the pipe $b$, connecting the valve $v'$ with the water-tank $al$, the pipe $c$, connecting the valve $v'$ with the water-tank $ar$, the pipe $f$, connecting the top of the tank $al$ with the valve $v^2$, the pipe $g$, connecting the valve $v^2$ with the nitrogen-tank $nl$, the pipe $d$, connecting the top of the tank $ar$ with the valve $v^3$, the pipe $e$, connecting the valve $v^3$ with the nitrogen-tank $nr$, the pipe $h$, connecting the top of the water-tank $al$ with the valve $v^4$, the pipe $j$, connecting the top of the water-tank $ar$ with the valve $v^4$, and, lastly, the exit-pipe $i$, leading to a place where the oxygenated air (resulting from the working of the apparatus) is either stored or used, all substantially as described in the foregoing specification, and for the purpose named.

ANTON STAMM.

Witnesses:
GEO. H. RICHEY,
CHARLES H. MURRAY.